United States Patent [19]
Vaughan

[11] Patent Number: 4,599,744
[45] Date of Patent: Jul. 8, 1986

[54] UHF BROADCAST ANTENNA ON A TOWER WITH CIRCULAR WAVEGUIDE CARRYING RF ENERGY UP THE TOWER TO THE ANTENNA WITH POLARIZATION ADJUSTMENTS AND EXCLUSIONS

[75] Inventor: Thomas J. Vaughan, Rye Beach, N.H.

[73] Assignee: Micro Communications, Inc., Manchester, N.H.

[21] Appl. No.: 550,410

[22] Filed: Nov. 10, 1983

[51] Int. Cl.[4] .......................... H04B 1/04; H01P 1/162
[52] U.S. Cl. .................................. 455/129; 333/21 A; 333/251; 343/890; 455/60; 455/63
[58] Field of Search ................... 333/21 R, 21 A, 251; 343/874, 875, 890; 455/60, 63, 129

[56] References Cited

U.S. PATENT DOCUMENTS

| | | | |
|---|---|---|---|
| 2,759,156 | 8/1956 | Younker | 333/251 |
| 2,975,380 | 3/1961 | Scharfman | 333/21 A X |
| 2,985,850 | 5/1961 | Crawford et al. | 333/21 R X |
| 3,184,695 | 5/1965 | Unger | 333/251 |
| 3,516,032 | 6/1970 | Wernli | 333/251 |

FOREIGN PATENT DOCUMENTS

| | | | |
|---|---|---|---|
| 2718684 | 11/1978 | Fed. Rep. of Germany | 343/890 |
| 820324 | 9/1959 | United Kingdom | 333/21 A |

*Primary Examiner*—Paul Gensler
*Attorney, Agent, or Firm*—Robert T. Dunn

[57] ABSTRACT

In an ultra high frequency (UHF), high power broadcast television (TV) antenna system that includes a radiating antenna located at the top of a tower structure many hundreds of feet high, a transmitter at the bottom of the tower and a circular waveguide transmission line between the transmitter and the antenna carried by the tower, an undesired polarization mode that is transverse to the desired polarization mode for which the antenna system is adjusted is excluded at the top of the tower structure at the end of the circular waveguide transmission line so that the undesired polarization mode does not energize the radiating antenna and, in particular, the undesired polarization mode does not energize the antenna and produce a ghost image in a TV receiver after reflecting from the bottom end of the circular waveguide transmission line back up to the antenna and does not add a standing wave in the circular waveguide transmission line.

10 Claims, 22 Drawing Figures

UHF BROADCAST ANTENNA ON A TOWER WITH CIRCULAR WAVEGUIDE CARRYING RF ENERGY UP THE TOWER TO THE ANTENNA WITH POLARIZATION ADJUSTMENTS AND EXCLUSIONS

BACKGROUND OF THE INVENTION

This invention relates to UHF, high power broadcast antennas systems and particularly to such a system for transmitting TV broadcast channels 19 to 70, in which the transmission line run up a tower from the transmitter to the radiating antenna at the top of the tower includes a substantial length of circular waveguide.

Broadcast antennas for television are frequently located on top of high towers that are constructed to offer minimum wind resistance. The transmitter is located on the ground near the tower and the radiating antenna is located at the top of the tower. A transmission line from the transmitter to the antenna is carried by the tower, either inside or the outside of the tower structure and is attached thereto by hardware that includes hangers, ties, etc. The cost of the tower, the transmission line, its hardware, elbows, transitions, transformers, barriers, hangers ties, etc., constitute just about the total cost of the antenna system. That cost, the cost of maintenance and the cost of operation are all important considerations. The cost of operation is directly related to the efficiency of the transmission line from the transmitter to the antenna (everything else being equal).

Recently, UHF, high power broadcast TV antennas for channels 21 through 70 that transmit 100 kilowatts (kw) and more, from an antenna on a tower that may be 2,000 feet high, have used circular instead of rectangular waveguide or coaxial transmission line to conduct the UHF power up the tower to a radiating antenna on top of the tower. The advantages of circular waveguide over coaxial transmission line are greater efficiency, higher power carrying capability and lower cost. The amount of electric power input to the system is very sensitive to the efficiency of the transmission line. An increase of 10% in the efficiency of the transmission line can reduce the power requirement by 30%.

Another advantage of waveguide over coaxial is that waveguides are high pass filters and so no energy will propagate in a waveguide below a UHF cut off frequency, whereas coaxial line will conduct from very low to very high frequencies. Also, coaxial line cost more per foot than waveguide and is more costly to operate than waveguide, because the equivalent coaxial line has greater attenuation. These cost and attenuation disadvantages of coaxial line relative to waveguide increase (get worse) as the tower height is increased.

The advantages of circular over rectangular waveguide are: lower wind load, greater efficiency, lower installation costs, no torsional twists due to wind and no rotation due to manufacturing twist. The disadvantage of circular waveguide is that: unless the circularity of the circular waveguide along its entire length is maintained within very precise tolerances, the desired polarization mode of waves launched into the circular waveguide in the fundamental $TE_{11}$ propagation mode is accompanied by an undesired cross (transverse) polarization mode in the same $TE_{11}$ propagation mode and since the efficiency of the coupling from the circular waveguide to the antenna at the top of the tower is highly sensitive to the direction of polarization (herein called the polarization mode) of this fundamental propagation $TE_{11}$ mode, the efficiency of coupling from the circular waveguide to the antenna suffers.

The cross polarization mode in a circular waveguide arises as follows. The $TE_{11}$ mode in circular waveguide is linearly polarized, but unlike rectangular waveguide, there can be the same propagation mode polarized transverse (cross) thereto. Theoretically, the two cross polarized modes in the circular waveguide are entirely independent of each other when the circularity of the waveguide is perfect. However, since structural circularity is not perfect and some ellipticity of the waveguide occurs, it is possible to create an elliptically polarized wave that will cause energy to be coupled from the desired to the undesired cross polarization mode. This coupling is most severe when the desired polarization mode direction is at forty five degrees to the major axis of the structural ellipse. The cross polarization can be minimized by maintaining close tolerances of circularity of the waveguide (within a few thousandths of an inch).

Non-circularity of a circular waveguide reduces efficiency. The undesired cross polarized mode wave gets trapped between transition sections that couple the circular waveguide to other transmission lines, such as rectangular waveguides at the top and bottom of the tower, resulting in a high voltage standing wave ratio (VSWR) therebetween. To avoid this, the circular geometry of the circular waveguide would have to be within a tolerance of a few thousandth of an inch for the trapped wave to be negligible. This problem of non-circularity is overcome using a technique taught in my co-pending U.S. patent application Ser. No. 449,734, filed Dec. 14, 1982 and entitled: UHF Broadcast Antenna On A Tower With Circular Waveguides Carrying RF Energy Up The Tower To The Antenna. That technique consists of causing a complementary elliptical polarization in the circular waveguide at the bottom of the tower in compensation for the undesired cross polarization mode caused by imperfections throughout the length of the circular waveguide run up the tower. The complementary, the desired and the undesired modes combine so that at the output end of the circular waveguide run there results a pure linear polarized wave that can be efficiently coupled to the radiating antenna at the top of the tower.

The many imperfections that may occur in a two thousand foot run of circular waveguide up a tower are of several kinds. There are those that produce discontinuity such as: offsets, where two sections of circular waveguide connect together; tilt, where the axis of the two sections define a slight angle; or even diameter changes from section to section; and non-circularity of the waveguide. All of these discontinuities tend to create new wave propagation modes. However, by careful design of the overall system in the selection of the circular waveguide diameter for the operating frequency and using special transitions between the circular waveguide and the rectangular waveguide feed at the bottom of the tower and also at the top between the circular waveguide and the antenna, the new modes are not propagated. Such special transitions are described in my co-pending U.S. patent application Ser. No. 484,220, filed Apr. 12, 1983, entitled: Transition Between Rectangular And Relatively Large Circular Waveguide For A UHF Broadcast Antenna. As taught therein, the new propagation modes created by the discontinuities will be well below the cutoff frequency of the circular waveguide and so will be down sixty dB and more.

As described in my first mentioned co-pending U.S. patent application Ser. No. 449,734, the complementary elliptical polarization is created at the bottom of the tower by an attachment to the circular waveguide called an ellipse generator that distorts the waveguide crosswise dimensions and is adjustable as to the direction and force of distortion. Following that, the circular waveguide to rectangular waveguide transition sections at the output end of the circular waveguide run (see the above mentioned patent application) are rotated as a unit so that the pure linear $TE_{11}$ polarization wave produced at that end of the circular waveguide is aligned with the electric (E) field of the $TE_{10}$ mode of the rectangular waveguide end of the transitions. However, where the transmission line at the top of the tower that feeds the antenna is rectangular waveguide, it often occurs that the rectangular waveguide end of the transition is not aligned with the rectangular waveguide feed line and so another adjustment must be made to align them. It is one object of the present invention to provide a method and means in such a circular waveguide transmission line for bringing the pure linear polarized wave from the circular waveguide and the transmission line at the top of the tower that feeds the antenna, into alignment with each other for efficient transmission.

Having adjusted the ellipse generator, at the bottom of the tower and the circular to rectangular waveguide transition at the top of the tower, as described above, and then aligned the rectangular waveguide end of the transition with the antenna feed line, the above object is accomplished, and all major imperfections in the system likely to increase VSWR and cause ghost signals are corrected and/or compensated for. However, this can be upset. It can be upset by changes in ambient temperature and wind gusts which cause dimensional changes in the circular waveguide. Other causes of upset can arise shortly after the erection of the tower and the vertical run, when the circular waveguide transmission line settles on the hangers that connect it to the tower and mechanical stresses are introduced that were not there before. It is another object of the present invention to provide a method and means of preventing the undesired cross polarization mode that arises at any time from energizing the antenna at the top of the tower.

SUMMARY OF THE INVENTION

Variable Mode Optimizer:

In a circular waveguide two thousand feet long there is a high probability that there will be some coupling from the desired polarization mode into the undesired cross polarization mode. Introducing an intentional distortion in the circular waveguide at the bottom of the tower to create a complimentary polarization can overcome the non-circularity problem as described in my co-pending application Ser. No. 449,734. However, there is a likelihood that the pure linear polarized wave at the top end of the circular waveguide will not be aligned for efficient coupling to the rectangular waveguide line at the top that feeds the antenna.

In one embodiment of the present invention described herein, the direction of the E field of the $TE_{10}$ mode in the rectangular waveguide line that feeds the antenna is gradually rotated as necessary to align it with the pure linear polarized wave from the output end of the circular wave guide. This is accomplished with a rectangular waveguide to rectangular waveguide E field rotation transition that gradually, in several steps, rotates the angle of the E field until it is parallel to the pure linear polarization wave from the circular waveguide (aligned with the rectangular waveguide end of the circular to rectangular waveguide transitions at the end of the circular waveguide). This variable rectangular to rectangular transition is referred to herein as the variable mode optimizer and consists of several short sections of rectangular waveguide that connect together on a common axis, each with its $TE_{10}$ mode E field adjustably rotated a few degrees with respect to the adjacent section. The optimizer is adjusted at the installation of the system, in coordination with the adjustments of the ellipse generator and the circular to rectangular waveguide transitions between the circular waveguide and the optimizer.

Another embodiment provides a coaxial line feed line at the top of the tower from the circular to rectangular waveguide transitions to the antenna. For that embodiment an end fire loop coupled transition section is provided from the rectangular waveguide end of the circular to rectangular transitions to the coaxial line. The loop is attached within the end fire transition section at the coaxial end thereof in proper alignment and connects to the center conductor of the coaxial feed line to the antenna. No adjustment of this loop is required. It is only required to rotate the transitions from the circular waveguide to the end fire transition in order to align the loop with the pure linear polarized mode from the circular waveguide. When that is done, efficient coupling from the circular waveguide to the antenna is insured.

Polarization Filter Shunt:

Having adjusted the ellipse generator, the circular to rectangular waveguide transitions and the variable mode optimizer, as in either of the above described embodiments, (referred to herein as the coordinated adjustment), at the installation of the antenna system, to produce a pure linear polarized wave from the circular waveguide that is efficiently coupled to the antenna, the VSWR in the circular waveguide should be reduced to such a minimum (less than 1.10) as to satisfy the most stringent specifications and certainly as good or better than can be accomplished with a vertical run of rectangular waveguide or coax. However, as sometimes occurs, due to changes in the ambient temperature and high winds, as during a sudden summer storm, the tower moves and dimensional changes occur in the circular waveguide and the undesirable cross polarization mode appears at the output of the circular waveguide.

Such ambient changes, even though temporary, can cause thermal contractions in the circular waveguide run in a two thousand foot tower to change the VSWR from 1.10 to 1.50. In a 220 kw TV broadcast antenna this means that 8.8 kw is reflected and travels the height of the tower twice after it is first reflected, before it energizes the radiating antenna at the top of the tower. This reflected signal can cause an annoying ghost or secondary image in a TV receiver that receives the broadcast. Later, when the ambient conditions return to the initial conditions and are essentially the same as when the coordinated adjustments were made, the ghost disappears.

Clearly, adjustments of the ellipse generator, the circular to rectangular transition and the variable mode optimizer cannot be made each time there is such an ambient change and so there is a need for a method and means of somehow removing the undesired cross polarized mode that occurs during such conditions. This is accomplished with a polarization filter in the circular waveguide that shunts the undesired cross polarization mode out of the system so that it does not energize the antenna. In a preferred embodiment, the shunt is located at the top of the tower so that the undesired mode does not get reflected down the circular waveguide, the theory being that the undesired mode is generated in the power flow up the circular waveguide and, if it can be removed by shunting before it is reflected back down the waveguide, then it will not be reflected back up again and produce a ghost. Removal of the undesired polarization mode at the top also results in a constant impedance as seen from the transmitter and low VSWR.

In another embodiment, the polarization filter shunt is located at the bottom of the tower. Removal of the undesired mode at the bottom will also eliminate the ghost, but may not result in constant impedance as seen from the transmitter or low VSWR. Inasmuch as the system may be controlled to shut down the transmitter in case of excessive impedance change or VSWR, the shunt at the bottom rather than the top may not be as effective. Such transmitter shut down puts the broadcast off the air and is to be avoided. On the other hand, there are more options available at the bottom of the tower for getting rid of the shunted energy than there are at the top. The greatest advantage is gained by providing such polarization filter shunts at both the top and the bottom of the circular waveguide.

It is another object of the present invention to provide a method and means of removing the energy of the undesired cross polarization mode at the top of the tower and dispose of that energy so that it does not contribute to signals received by receivers of the antenna radiation.

Other objects and features of the present invention will be apparent from the following specific description of embodiments of the invention taken in conjunction with the figures.

DESCRIPTIONS OF EMBODIMENTS OF THE INVENTION

Figure 1:
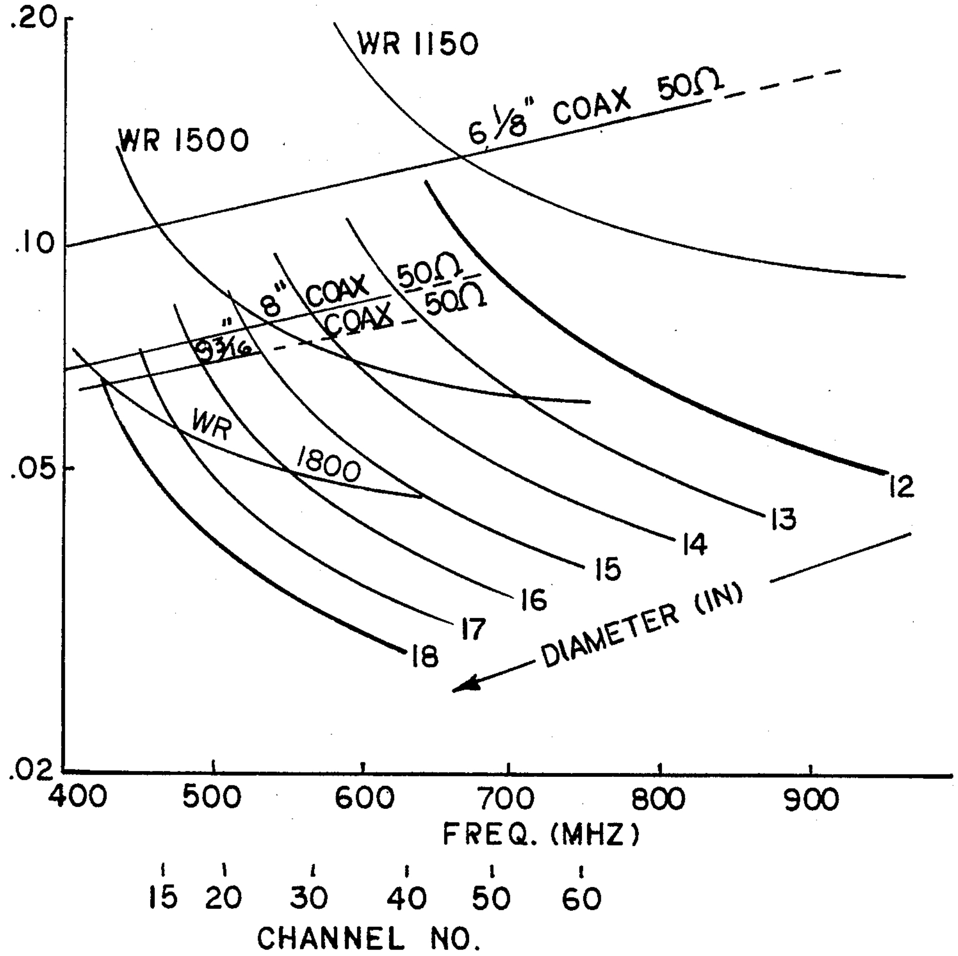
FIG. 1 is a graph of attenuation, in db per 100 ft., over the UHF frequency range for coaxial, rectangular waveguide and circular waveguide transmission lines of equivalent sizes, recommended by EIA, to illustrate some advantages of circular waveguide.

FIG. 1 is a graph of attenuation in db per one hundred foot over the UHF frequency range for coaxial, rectangular waveguide and circular waveguide transmission lines of electrically equivalent sizes, recommended by EIA, to illustrate some advantages of circular waveguide.

Figure 2:
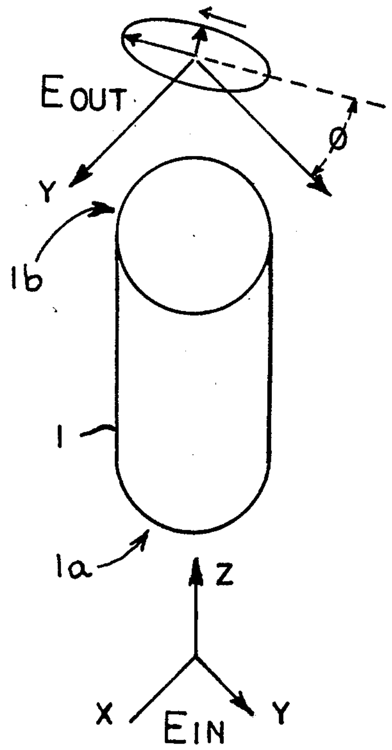
FIG. 2 shows a circular waveguide and vectors representing polarized waves launched into one end of the waveguide and out the other end to illustrate the depolarization effect of the imperfectly circular guide.

FIG. 2, illustrates the depolarizing effect of an imperfect circular waveguide where the input generates the fundamental $TE_{11}$ propagation mode at one end of the waveguide. The principle vector Y of a $TE_{11}$ linear polarized wave enters the circular waveguide 1 at one end, 1*a* thereof. At the other end, 1*b* of the circular waveguide the wave emerges as two waves whose principal vectors are displaced in orientation and in phase, resulting in a polarization ellipse at that point, characterized by an axial ratio at the orientation angle $\phi$ and a sense of rotation.

Figure 3A:
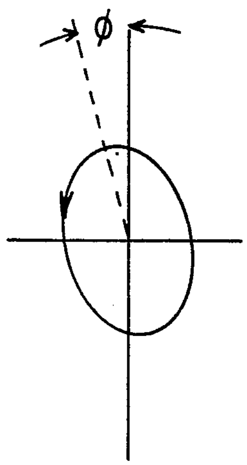
FIGS. 3*a* and 3*b* show vector diagrams illustrating complementary elliptical polarizations.
Figure 3B:
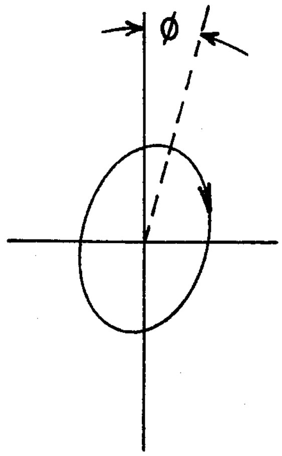

What has been generated by the imperfections of the waveguide can also be generated by deliberately deforming the waveguide. More particularly, if a complimentary ellipse is deliberately generated, the polarization ellipse at the output can be corrected leaving the output linearly polarized just like the input. Complimentary ellipses of polarization are shown in FIGS. 3*a* and 3*b* where the axial ratios are identical; that is, the ratio of major to minor axis are the same. Rotation sense, however is opposite in FIGS. 3*a* and 3*b* and so the angular displacements $\phi$ of these ellipses are complementary.

Figure 4:
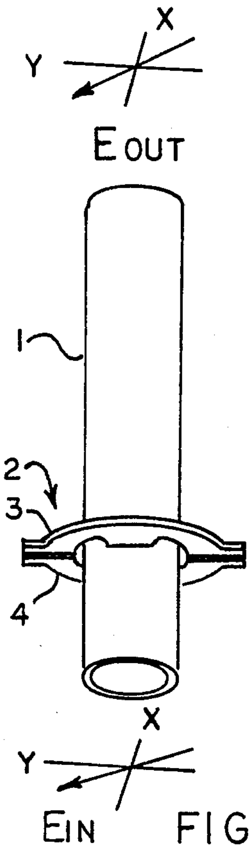
FIG. 4 shows the ellipse generator structure attached to the circular waveguide that causes a complementary polarization to cancel the undesired cross polarization mode in the circular waveguide.
Figure 5:
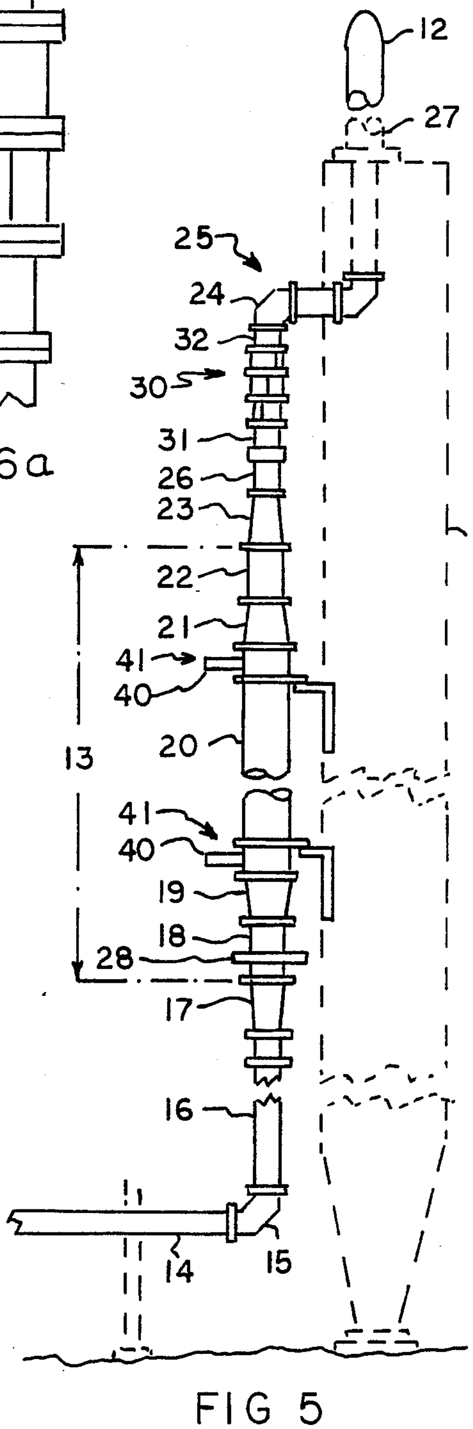
FIG. 5 shows a UHF TV broadcast antenna system including a tower, transmitter, antenna, circular waveguide feed up the tower to the antenna, transitions, ellipse generator, mode optimizer and polarization filter shunts as an illustration of an embodiment incorporating features of the present invention.

FIG. 4 illustrates a technique of producing the complementary ellipse using the ellipse generator described in my co-pending patent applications mentioned above. As shown, the ellipse generator 2 is attached to the outside of the circular waveguide 1. The two parts 3 and 4 of ellipse generator, are mirror images and encircle the circular waveguide. They are connected together by means (not shown) for adjusting the force administered against the circular waveguide to distort the dimensions thereof. The position of the ellipse generator on the circular waveguide and the angular orientation can be adjusted as required to cause the complementary ellipticity. Clearly, the longitudinal position of the device, on the circular waveguide is adjustable, and the radial direction of the force and the amount of that force are adjustable. Thus, there are three physical parameters of adjustment available to bring about the desired complementary ellipticity. A measure of this may be had by measuring the VSWR in the circular waveguide as described herein with reference to FIGS. 8*a* and 8*b* and adjusting the parameters of the ellipse generator to eliminate the spikes. If this compensation is effective, then the RF energy at the output is all polarized in the same direction and coupling from the output end to the radiating antenna can be very efficient. FIG. 5 shows a UHF TV broadcast antenna system including a tower 11 with a radiating antenna 12 at the top thereof that radiates horizontally polarized radiation. The tower supports the circular waveguide transmission line 13 that feeds the antenna. At the bottom of the tower, the transmitter (not shown) feeds RF power by rectangular waveguide 14, on the ground, rectangular waveguide elbow 15, a relatively short vertical run of rectangular waveguide 16 and a rectangular to circular waveguide transition 17 to the circular waveguide 13. A short length of smaller circular waveguide 18 and a circular waveguide transformer 19 couple the rectangular waveguide to the larger circular waveguide transmission line 20 that extends up the length of the tower to the top thereof.

At the top of the tower, the circular waveguide 13 is coupled to the radiating antenna 12. This is done using the same sort of circular waveguide size reduction and circular to rectangular transition section as at the bottom of the tower. For example, a transformer section 21 from the large diameter to relatively smaller diameter circular waveguide 22 and a circular to rectangular waveguide transition 23 couples to the rectangular waveguide 25 that feeds RF to the antenna 12 via coupler 27. The sections 18 and 22, at the top and bottom, of smaller diameter circular waveguide are cutoff to the higher order propagation modes generated at discontinuations as explained more fully in my co-pending U.S. patent application Ser. No. 484,220 mentioned above. Clearly, the efficiency of the transitions and coupling to the antenna 12 will depend upon the singularity of polarization of the dominant propagation, $TE_{11}$, mode at the end of the circular waveguide transmission line run 13. It is presumed that the transformer section 21 and short length of smaller diameter circular waveguide 22 do not effect this efficiency. In order to insure the singularity of that polarization, the ellipse generator device 28 is attached to the circular waveguide at the bottom of the tower where there is ready access, and is positioned and adjusted as already described to produce a minimum VSWR in the circular waveguide run 13. The VSWR may be detected at the bottom end of 13 and coupled to a VSWR meter (not shown).

Figure 6A:
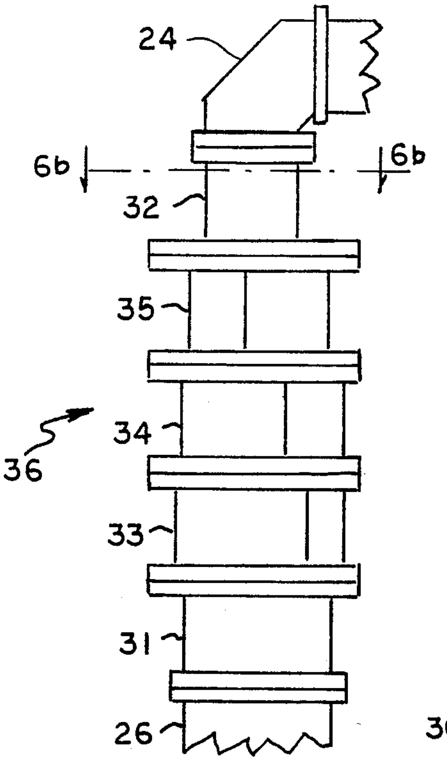
FIGS. 6*a* and 6*b* are front and top views respectively, of the variable mode optimizer.
Figure 6B:
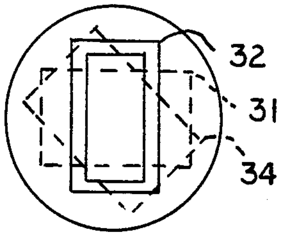

The variable mode optimizer 30 is located between the transition 23 and the E plane elbow 24 of the rectangular waveguide line 25 that feeds the antenna 12. As shown in FIGS. 6*a* and 6*b*, it connects to a section of rectangular waveguide 26 from transition 23 by rectangular waveguide section 31, both of which are in registration with the rectangular waveguide end of the transition 23. At the top end, the optimizer connects to elbow 24 by rectangular waveguide section 32 that is in registration with that elbow. Between the sections 31 and 32 are, for example, three identical rectangular waveguide sections 33 to 35 which are attached together by their flanges so that they can be connected at different radial positions with respect to each other. For example, if they are attached with their $TE_{10}$ mode E fields successively rotated in the same direction twenty-two and a half degrees each (as shown in FIG. 6*b*), the E field of the input section 31 and the output section 32 will be perpendicular. In this way the E field of the rectangular waveguide line 25 that feeds the antenna 12 is rotated as required to bring it aligned with the pure linear polarized wave (the desired mode) from the circular waveguide 13.

Figure 7A:
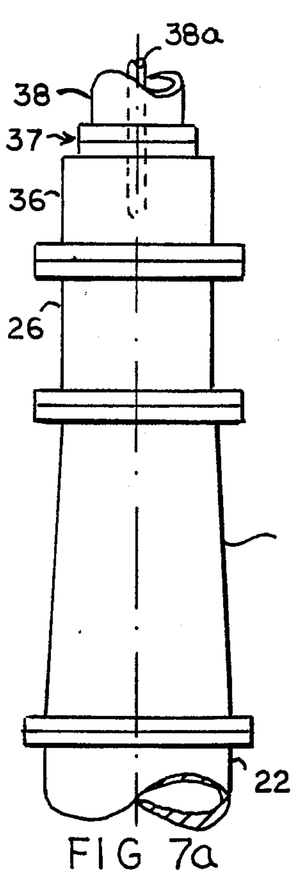
FIGS. 7*a* and 7*b* are two views of the end fire loop coupled transition from rectangular waveguide to coaxial line feed to the antenna which requires no rotational adjustment to align the feed with the desired polarization mode from the circular waveguide.
Figure 7B:
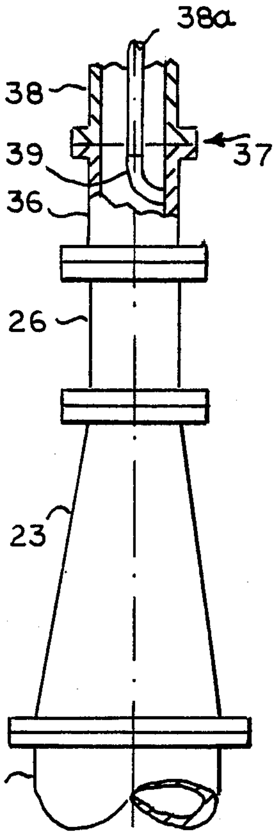

Another embodiment shown in FIGS. 7*a* and 7*b* uses a coaxial line feed to the antenna at the top of the tower. This avoids the step of aligning the desired mode from the circular waveguide with the feed line to the antenna, because coaxial line has no axial position, it is electrically the same at all angles of rotation on its axis. As shown by FIGS. 7*a* and 7*b*, the rectangular waveguide section 26 connects to an end fire loop transition section 36 which is a rectangular waveguide section with an end fire connection 37 at one end to the coaxial line 38 that feeds the antenna. A loop 39 is fixed to the end of section 36 as shown, in a plane parallel to the E field of section 26 and meets the center conductor 38*a* of the coaxial line 38 that attaches to connector 37.

At the coordinated adjustment, the set of sections 23, 26 and 36 are all rotated together to align the E field of 36 and the loop 39 which is fixed to 36 with the desired pure polarization mode from section 22 of the circular waveguide run.

Coordinated Adjustment of the Antenna System

Figure 8A:
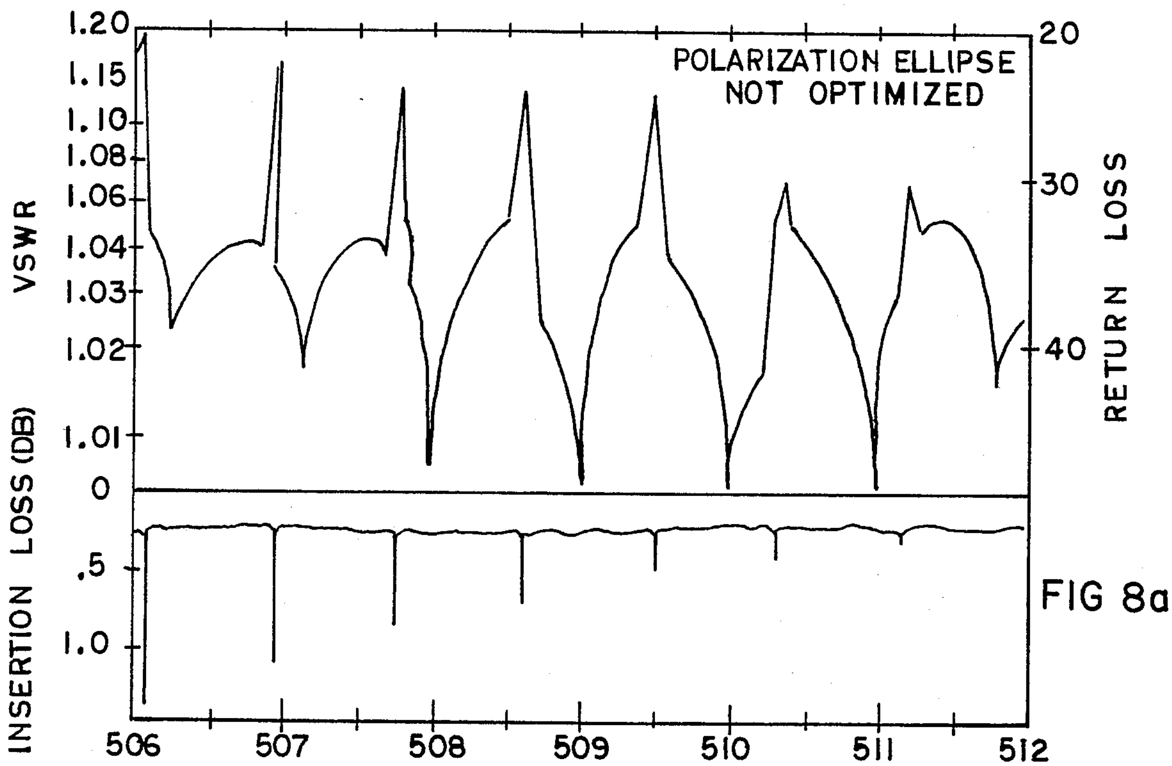
FIG. 8*a* shows plots of VSWR and insertion loss, versus frequency for the antenna system when the circular waveguide feeds UHF energy to the antenna in both the desired polarization mode and the undesired cross polarization mode.
Figure 8B:
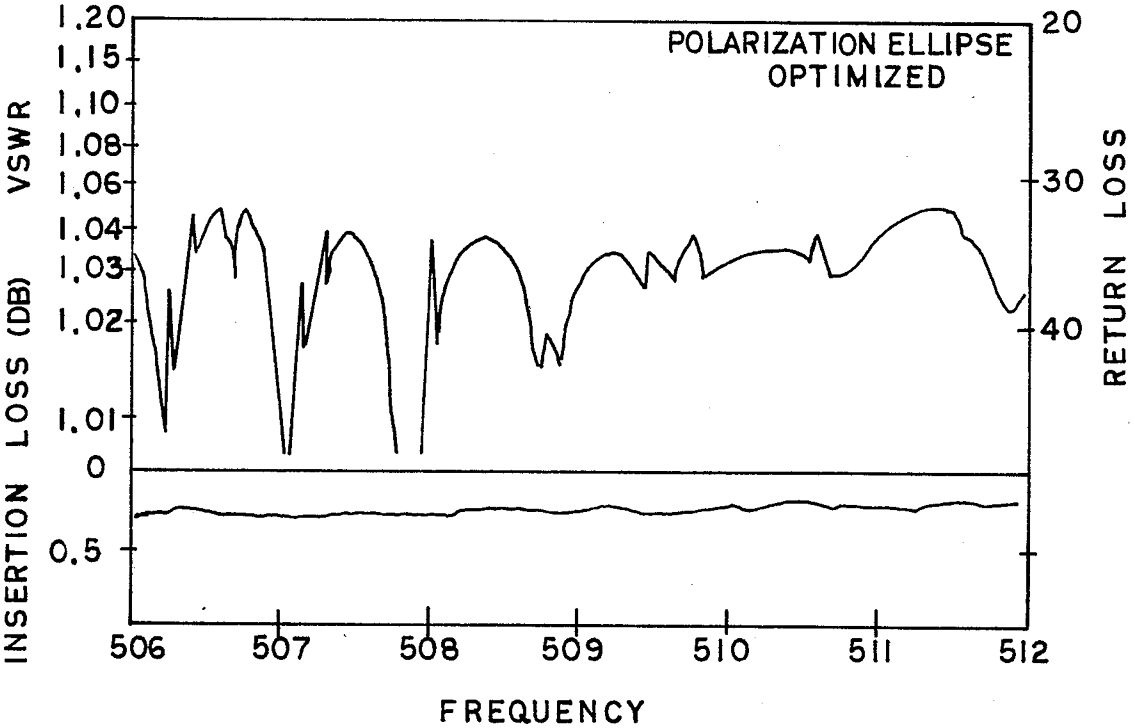
FIG. 8*b* shows the same plots as FIG. 8*a*, but without any undesired cross polarization mode.

Upon erection of the antenna system shown in FIG. 5, the ellipse generator is adjusted as described to produce a pure linear polarized wave from the circular waveguide 13 at the top of the tower. This is done by measuring the return loss or VSWR over the frequency range of operation. Typical results of this measurement in an adjustment of a 380 foot run of circular waveguide to a broadcast antenna for TV channel 20 (506 to 512 MHz) might appear as shown in FIGS. 8*a* and 8*b*. FIG. 8*a* shows plots of VSWR and insertion loss, versus frequency. It is evident from FIGS. 8*a* that although the major polarization direction of the $TE_{11}$ wave from the circular waveguide at the top of the tower is aligned with the E field of the line (like line 25) that feeds the antenna, the wave is elliptically polarized, because it includes both the desired and undesired cross polarization modes. In other words, while most of the energy is coupled to the line 25, some is reflected and the circular waveguide transmission line acts like a high Q resonant cavity for the undesired cross polarized component and so it appears as a spike in the VSWR plot.

The general scalloped appearance of the plots of frequency versus VSWR in FIGS. 8*a* and 8*b* is because the cavity defined by the circular waveguide run and its input and output ends is resonant between 506 and 512 MHz at frequencies about 0.8 MHz apart.

The corresponding insertion loss measurement in FIG. 8*a* shows there is a relationship between the level of the spikes and the loss at a particular frequency. The total attenuation $\alpha_T$ is given by:

$$\alpha_T = \alpha cross + \alpha desired$$

In this expression the loss due to mismatch is neglected since it is only 0.004 dB for a return loss of 30 dB (VSWR=1.06). Total measurements show that for the spike loss to be negligible, the spike return loss should be not less than about 26 dB for a one thousand foot vertical run and that when the undesired cross polarized component is removed, the attenuation measure is the calculated value for the circular waveguide.

Upon adjustment of the ellipse generator 28 at the bottom of the run, and rotation of the circular to rectangular set of transition sections 41, 21, 22 and 23 at the top of the tower to align the desired polarization mode with the E field of the rectangular end of these transitions, the spikes disappear, as shown in FIG. 8*b*, and so it is presumed that the wave from the circular waveguide 13 at the top of the tower is a pure linear polarized wave.

Figure 9A:
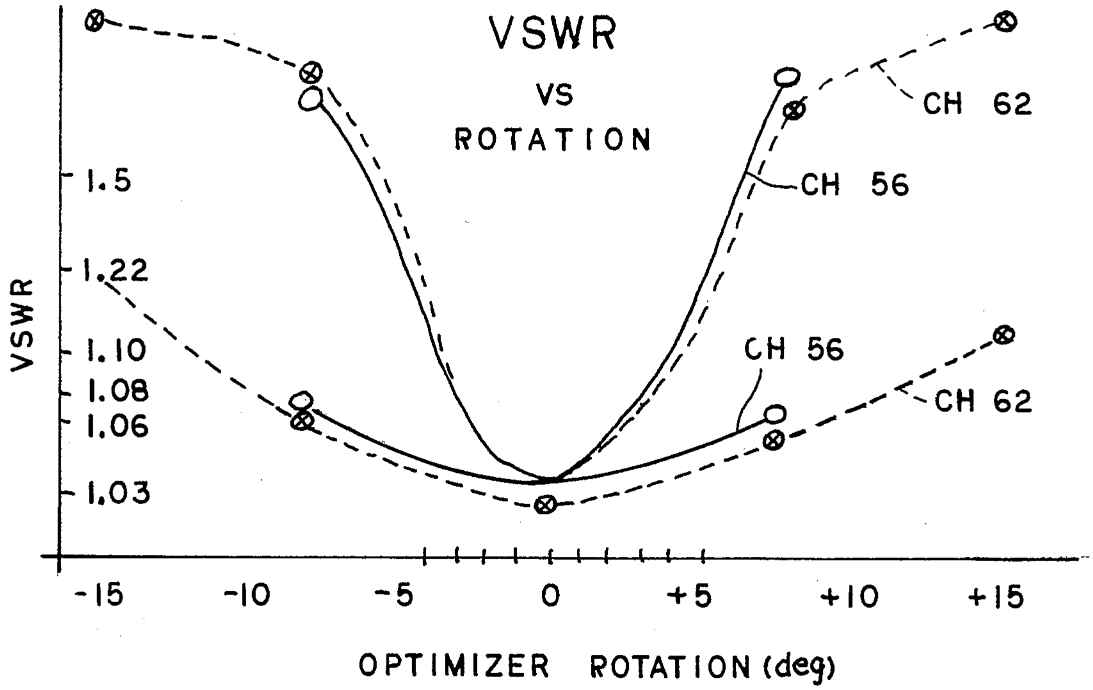
FIG. 9*a* is a plot of VSWR, versus the angle between the desired linear polarized wave from the circular waveguide and the E field of the rectangular waveguide line to the antenna, for the desired polarization mode and for the undesired cross polarization mode, to illustrate the effect of the coordinated adjustments of the ellipse generator and the variable mode optimizer.
Figure 9B:
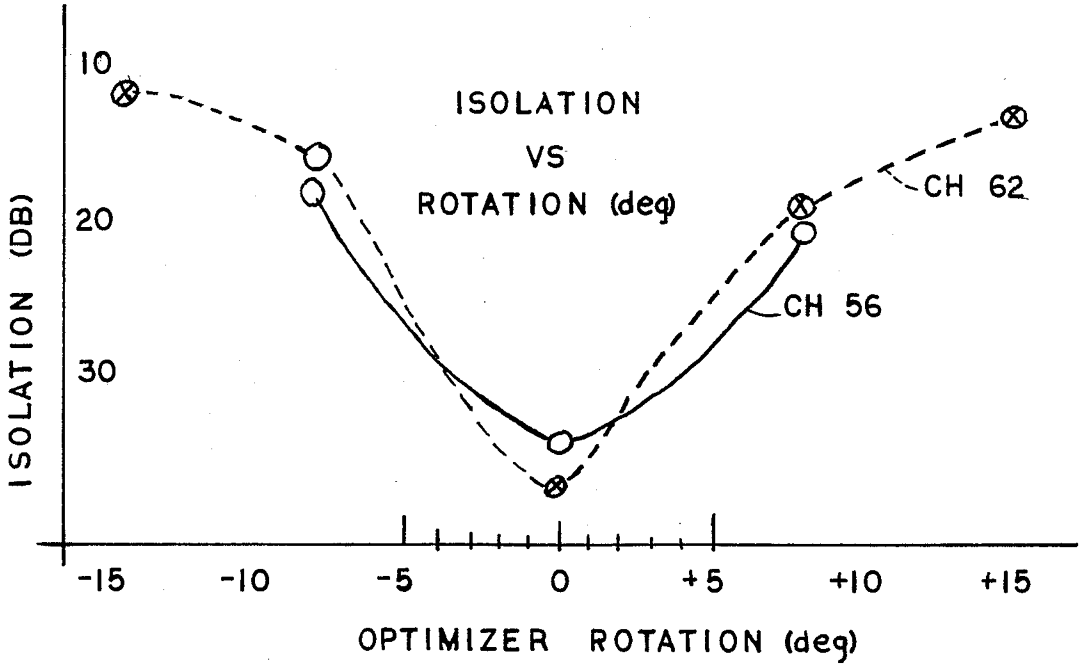
FIG. 9*b* is a plot of isolation of the undesired cross polarization mode that is conducted by the filter shunt versus the angle between the desired linear polarized wave from the circular waveguide and the E field of the rectangular waveguide line to the antenna to illustrate the effect of the polarization filter.

The next step is to adjust the variable mode optimizer 30 to be sure that the pure linear polarized wave and the E field of the rectangular waveguide line 25 (beginning with elbow 24) are aligned. Reflection (VSWR) of the desired pure linear polarized wave from the circular waveguide is not as sensitive to misalignment of the optimizer as the undesired cross polarization mode. Thus, a measure of VSWR of the desired mode at a few degrees of rotation on either side of alignment shows negligible change. However, a few degrees on either side of alignment causes a relatively large change in the VSWR of the undesired mode. This is shown by the plots in FIG. 9*a* of VSWR, versus optimizer rotation, in degrees clockwise or counterclockwise from alignment (zero). The effect of optimizer misalignment on the desired mode is negligible, even when it is ten degrees off. For example, at ten degrees, VSWR for the desired mode is 1.08, whereas at zero degrees it is 1.03. The more sensitive measurement of alignment is made of the undesired mode, where a ten degree misalignment produces a VSWR change of from 1.03 to about 2.0.

The preferred procedure of carrying out the coordinated adjustment is: first, adjust by rotating the set of transitions 41, 21, 22 and 23 and then the optimizer 30, making use of the spikes as a sensitive measure of the alignment of these. Then adjust the ellipse generator to eliminate the spikes. Once the spikes are eliminated, the optimizer can be rotated again each side of its position and settle at the position where VSWR of the desired mode and the cross mode are lowest. Upon accomplishing that, the coordinated adjustments are complete and optimum system performance can be expected.

Transient, Ambient and Other Changes

Upon making the coordinated adjustments, as described above, system performance is optimized and if the total system remains absolutely rigid thereafter with no dimensional changes, continued optimum performance can be expected. However, dimensional changes do occur. Transient, ambient conditions and other unforeseen or unanticipated events like shifts of the tower structure can occur, causing dimensional and alignment changes that give rise to the generation of the undesired cross polarization mode.

When any such dimensional changes occur, the coordinated adjustment could be carried out again to correct them. However, that is time consuming and would require shutting down the system (taking it off the air) which is to be avoided. According to another feature of the present invention, this problem is solved by removing the undesired cross polarization mode so that it does not energize the antenna. Preferably, it is removed at the top of the circular waveguide 13 run so that it does not travel a round trip of that run and then energize the antenna. For this purpose a polarization filter shunt 40 (see FIG. 5) is located at the top of the run in the short rotatable section of circular waveguide 41 that is attached to the end of the circular waveguide section 20, as shown in FIG. 5. This section 41 and sections 21, 22 and 23 are adjusted by rotating them as a set in the coordinated adjustment, so that the desired polarization mode is aligned with the E field of the rectangular end of section 23. When this is accomplished, the shunt 40 will be at a predetermined orientation to the desired mode, calculated to remove only the undesired cross polarization mode. Several different constructions of suitable polarization filters, are described herein and shown by FIGS. 10, 11 and 12.

The purpose of the polarization filter is to remove the undesired cross polarization mode energy. The problem then is to get rid of the energy. When the filter is located at the top of the tower, it is not practical to provide an absorbing load for the energy, because it would have to absorb several kilowatts in a typical TV broadcast antenna and would have to be cooled and so would be large. For example, if the broadcast power was 220 kw the load would have to absorb as much as 8.8 kw which requires a relatively large structure. On the other hand, if the filter shunt is located at the bottom of the tower, there is no problem with size and weight, because the load can be located on the ground.

At the top of the tower it is convenient to dissipate the undesired cross polarization mode energy by radiating it into space. However, when that is done, the energy must be radiated so that it does not interfere (add to) the radiation from the broadcast antenna 12 that is received by an intended receiver. Where the transmission is broadcast TV, the broadcast radiation is required to be horizontally polarized. In that case, the energy radiated by the shunt can be vertically polarized so that it is not picked up by a TV receiver antenna designed for detecting horizontally polarized radiation.

Where the broadcast radiation from the antenna 12 is not linearly polarized one way or another, then the radiation from the shunt can be made directional and directed where the broadcast antenna pattern does not perform. For example, it can be directed where no reception is expected, because there are no receivers in that direction or the pattern is blocked by buildings or a mountain. In that case, the energy can be directed as a narrow beam and so it will not interfere with the signals of the useable broadcast pattern.

Figure 10B:
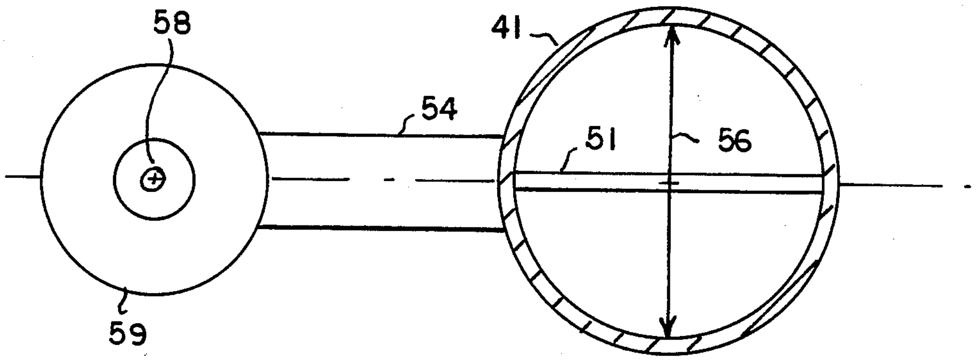
FIGS. 10*a* and 10*b* are front sectional and top views of a suitable polarization filter shunt in which the shunt is a radiating coaxial stub.
Figure 10A:
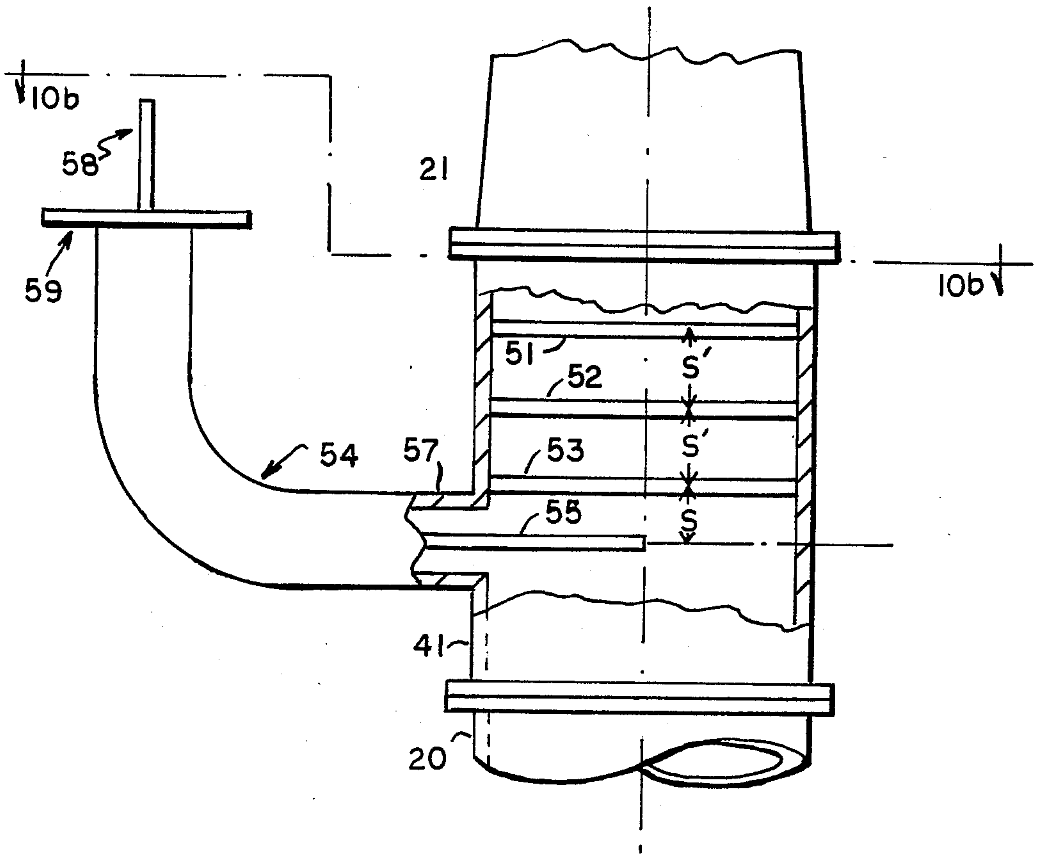

FIGS. 10*a* and 10*b* are front and top cross section views of a polarization filter shunt constructed in the short section of circular waveguide 41 at the top of the vertical run 13. It consists of three transverse conductors 51, 52 and 53 in the section oriented perpendicular to the desired polarization mode. A coaxial line shunt 54 parallel to these conductors projects through the wall of section 41, with the center conductor 55 of the coaxial shunt projecting to about the center of the circular waveguide. The top view, shown in FIG. 10*b* indicates by arrow 56 the direction of the desired polarization mode. The spacing between the three conductors 51 to 53 and between conductor 53 and the center conductor 55 of the coaxial shunt are denoted in FIG. 10*a* as dimensions S' and S, respectively, which are fractions of a wave length in the guide (λg) of the radiated frequency as follows:

$$S=(0.1 \text{ to } 0.3)\lambda g$$

$$S'=(0.05 \text{ to } 0.1)\lambda g$$

The length of the coaxial shunt is preferably an odd number of quarter wavelengths of the broadcast frequency so that the open end will radiate into space efficiently. When the antenna 12 broadcasts horizontally polarized radiation, as for TV, the radiation from the shunt is made vertically polarized by extending the center conductor 55 from the outer conductor 57 of the coaxial shunt 54 as a vertical monopole 58 and extending the outer conductor 57 horizontally to form a ground plane 59 for the monopole.

Figure 11C:
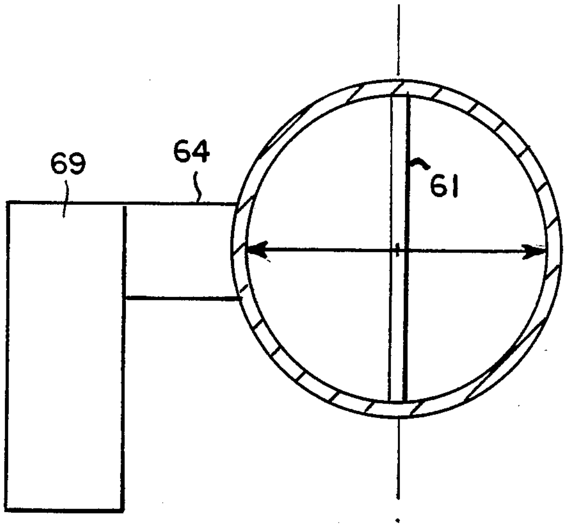
FIGS. 11*a*, 11*b* and 11*c* show front sectional, side and top views of another suitable structure of the polarization filter shunt in which the shunt is a radiating rectangular waveguide stub.
Figure 11A:
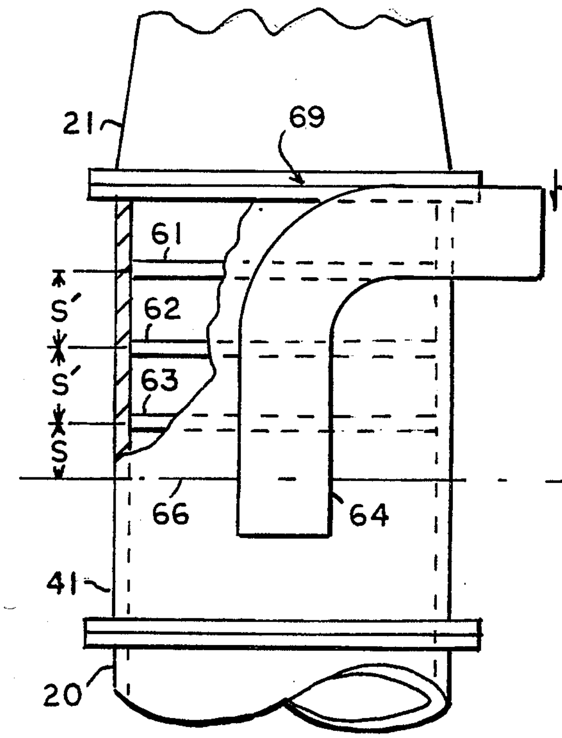
Figure 11B:
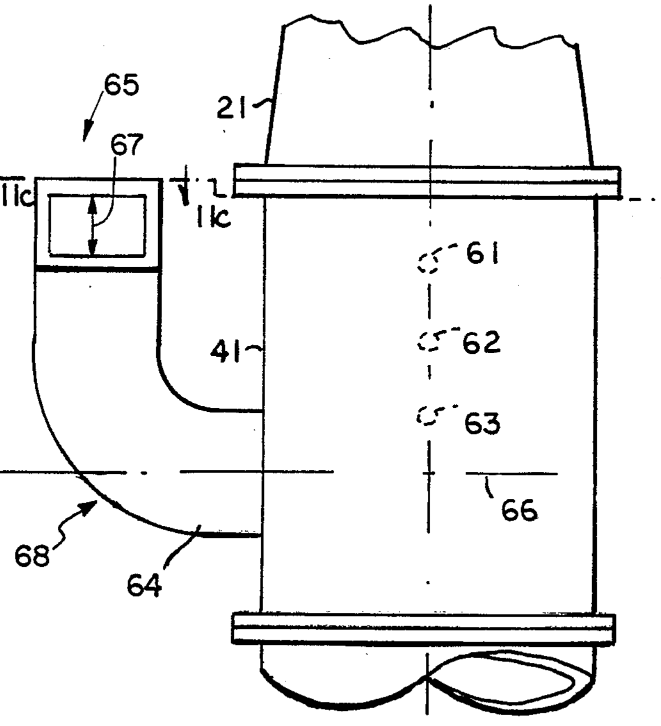

FIGS. 11*a*, 11*b* and 11*c* are front, side and top views of another suitable polarization filter for attachment to the circular waveguide section 41. Here, three transverse conductors 61, 62, and 63 are evenly spaced across the inside of the circular waveguide section 41 and a rectangular waveguide shunt 64 is attached and electrically coupled to the circular waveguide, oriented with its E field parallel to the conductors 61 to 63 and perpendicular to the desired polarization mode 65 in the circular waveguide, as shown in FIG. 11*b*. The dimension between the center line 66 of the shunt waveguide 64 and the first conductor 63 is S and the other two conductors are spaced from each other the dimension S'.

The length of shunt 64 is preferably an odd number of quarter wavelengths of the broadcast frequency so that it will radiate efficiently from its open end. Furthermore, for TV broadcast, where the broadcast radiation from antenna 12 is horizontally polarized, the shunt 64 is oriented so that at the open end 65 the E field (indicated by arrow 67) is vertical so that radiation from it is vertically polarized. For this purpose, the shunt goes through a 90° H field turn at 68 and then a 90° E field turn at 69.

Figure 12C:
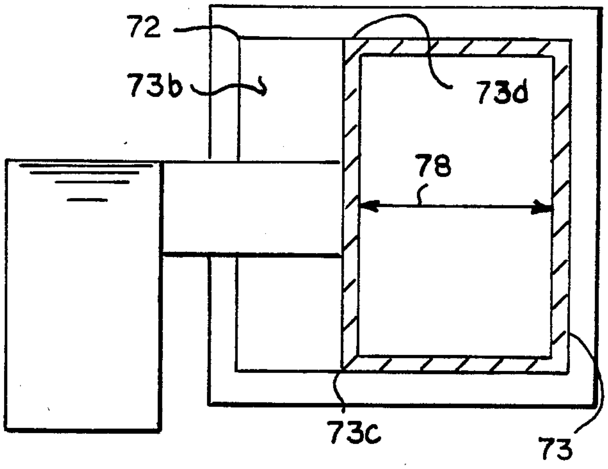
FIGS. 12*a*, 12*b* and 12*c* show front, side and top views of another suitable structure of polarization filter shunt that includes a circular waveguide to square waveguide transition that feeds both the shunt and the rectangular waveguide line that feeds the antenna.
Figure 12A:
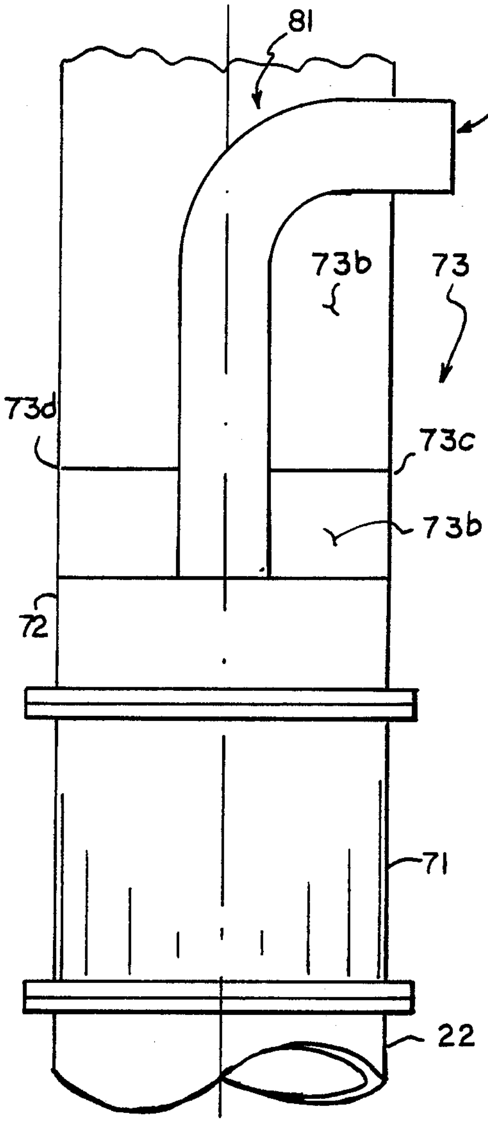
Figure 12B:
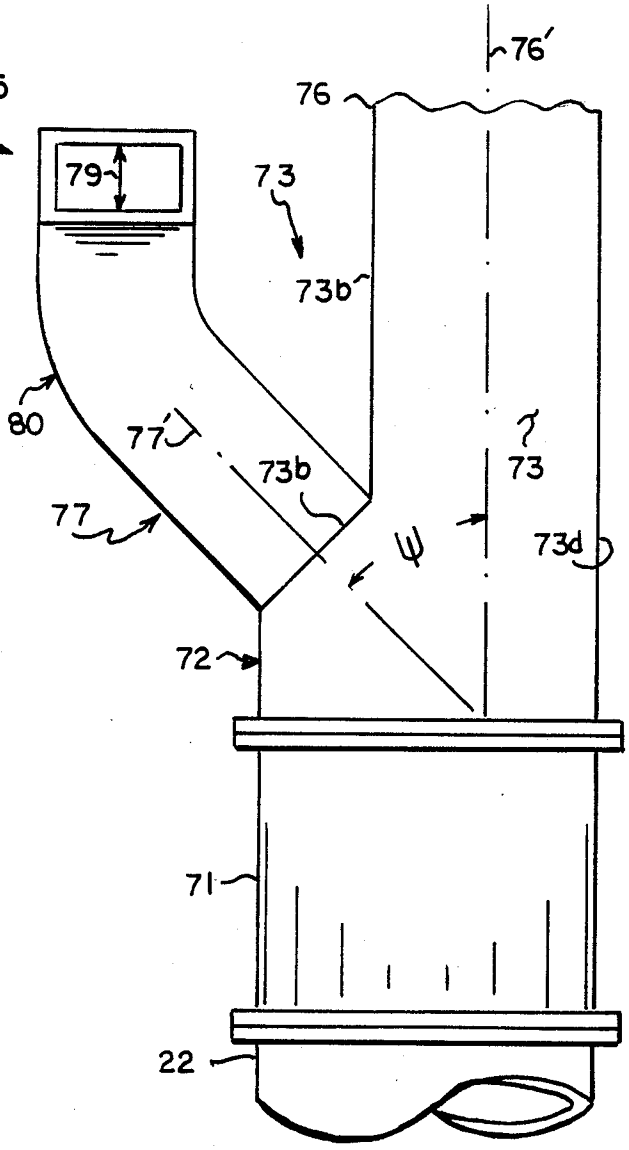

Another suitable polarization filter and shunt is shown in FIGS. 12*a*, 12*b* and 12*c* which are front, side and top views, respectively. This structure provides the polarization filter and also replaces the circular to rectangular transition 23 at the top of the tower. Here, the circular waveguide section 22 connects to a transition 71 that goes from a matching circular waveguide where it connects to 22, to a square waveguide where it meets square waveguide section 72. Section 72 leads to a transverse rectangular waveguide power divider 73. The bottom end of power divider 73, where it connects to 72 is square.

The four walls of the power divider, denoted 73*a* to 73*d*, are as follows. Wall 73*a* continues from the square waveguide as one of the major walls of the rectangular waveguide 76 that feeds the antenna. The opposite major wall 73*b* of 76 meets the opposite wall of the square waveguide and immediately slopes towards 73*a* to define the major dimension of the rectangular waveguide 76. The walls 73*c* and 73*d* also meet corresponding walls of the square waveguide and extend therefrom and define the side walls of rectangular waveguide 76, both being cut back by the slope of wall 73*b* where it slopes toward 73*a*. From that sloping wall, 73*b*, projects the shunt rectangular waveguide 77 with its axis 77' at an angle $\psi$ to the axis 76' of rectangular waveguide 76. Thus, the major dimension of the shunt waveguide 77 is parallel to the minor dimension of waveguide 76 that feeds the antenna and visa versa. In other words, the rectangular waveguides 76 and 77 are oriented with their corresponding major and minor dimensions perpendicular.

The direction of the desired polarization mode from the circular waveguide 22 is parallel to the E field of rectangular waveguide 76, as indicated by arrow 78 in FIG. 12*c*. At the coordinated adjustment, the entire structure shown in FIG. 12*a* down to and including section 71 is rotated as necessary to align the desired mode with the E field of 76. The angle $\psi$ is preferably about 45° and may be as small as 30° or as large as 60°.

For a TV broadcast antenna, where the rejected energy from the shunt is radiated into space, the shunt is oriented so that at the open end 75, the E field (indicated by arrow 79) is vertical. In order to accomplish that, the shunt waveguide goes through a $\psi$ H field turn at 80° and then a 90° E field turn at 81.

The techniques described herein for a circular waveguide transmission line of aligning the desired polarization mode at the output end of the waveguide with an antenna feed transmission line and removing the energy of the undesired polarization mode are incorporated in the specific embodiments. Clearly, the same techniques could be applied with greater or less sophistication to improve other antenna systems than those mentioned herein. Also, the techniques could be applied to a receiving antenna system for corresponding benefits. Clearly, all such applications of the techniques are contemplated by the present invention as set forth in the claims.

What is claimed is:

1. A circular waveguide transmission line system for conducting high frequency waves comprising, (a) a substantial length of circular waveguide having an input end and an output end, (b) means for launching high frequency desired waves into said circular waveguide at said input end thereof having a desired polarization mode direction so that said desired waves flow from said circular waveguide output, (c) a polarization filter shunt attached to said circular waveguide for conducting high frequency waves having an undesired polarization mode direction from said circular waveguide so that said undesired waves do not flow from said circular waveguide output, (c) said polarization filter shunt including:

(d) short circuit conductors inside said circular waveguide contacting opposite walls thereof, said conductors being arranged parallel to each other and perpendicular to the direction of said desired polarization mode and (e) a shunt transmission line connected to the outside wall of said circular waveguide with an opening through said outside wall for coupling fields of said undesired polarization mode waves to a fundamental mode of wave propagation in said shunt, (f) whereby said undesired waves produced in said circular waveguide due to coupling between said desired and undesired polarization mode waves do not flow from said circular waveguide output.

2. A transmission line system as in claim 1 wherein the spacing between adjacent of said short circuit conductors is not greater than 0.1 wavelengths of said undesired polarization mode waves.

3. A transmission line system as in claim 1 wherein the longitudinal axis of said shunt is transverse to the longitudinal axis of said circular waveguide and spaced a distance from the nearest of said short circuit conductors toward said circular waveguide input which is less than 0.3 wavelength of said undesired wave.

4. A transmission line system as in claim 3 wherein said shunt is a coaxial transmission line and said shunt longitudinal axis is parallel to said short circuit conductors.

5. A transmission line system as in claim 3 wherein said shunt is a rectangular waveguide transmission line and shunt longitudinal axis is perpendicular to said short circuit conductors.

6. A circular waveguide transmission line system for conducting high frequency waves comprising, (a) a substantial length of circular waveguide having an input end and an output and, (b) means for launching high frequency desired waves into said circular waveguide at said input end thereof having a desired polarization mode direction so that said desired waves flow from said circular waveguide output, (c) a polarization filter shunt attached to said circular waveguide for conducting high frequency waves having an undesired polarization mode direction from said circular waveguide so that said undesired waves do not flow from said circular waveguide output, wherein said polarization filter shunt includes, (d) a square waveguide section that feeds two rectangular waveguide sections of which:

(e) one rectangular waveguide section longitudinal axis is parallel to the longitudinal axis of said square waveguide section, and (f) the other rectangular waveguide section longitudinal axis is at an angle to said longitudinal axis of said rectangular waveguide section, and (g) said two rectangular waveguide sections are oriented with their major transverse axes perpendicular where their said longitudinal axes cross, (h) a square waveguide-to-circular waveguide transition section, (i) said square waveguide section connects end-to-end with longitudinal axes coincident to said waveguide transition section, and (j) the circular end of said waveguide transition section connects to said circular waveguide output with said longitudinal axes thereof coincident, (k) whereby said desired polarization mode waves are output from said one rectangular waveguide section and said undesired polarization mode waves are output from said other retangular waveguide section.

7. In a high power antenna for UHF TV frequency broadcast including a radiating antenna located at the top of a tower, a transmitter located at the bottom of said tower, a substantial length of circular waveguide transmission line for conducting UHF power from the transmitter to the antenna supported by the tower, the improvement comprising, (a) a polarization filter shunt including a shunt transmission line attached to said circular waveguide for conducting undesired waves therefrom to a load wherein said polarization filter shunt includes, (b) short circuit conductors inside said circular waveguide contacting opposite walls thereof, said conductors being arranged parallel to each other and perpendicular to the direction of polarization of said desired waves; and (c) said shunt transmission line connects to the outside wall of said circular waveguide with an opening through said wall for coupling fields of said undesired waves to a fundamental mode of propagation in said shunt (d) whereby said undesired waves produced in said circular waveguide due to coupling between waves of the same propagation mode, but different polarization directions flow to said shunt transmission line and said desired waves polarized in a desired direction flow from said circular waveguide to said antenna at the top of said tower.

8. The improvement as in claim 7 wherein the longitudinal axis of said shunt is transverse to the longitudinal axis of said circular waveguide and spaced a distance from the nearest of said shortcircuit conductors toward said circular waveguide input which is less than 0.3 wavelength of said undesired wave.

9. The improvement as in claim 8 wherein said shunt is a rectangular waveguide transmission line and said shunt longitudinal axis is perpendicular to said short circuit conductors.

10. In a high power antenna for UHF TV frequency broadcast including a radiating antenna located at the top of a tower, a transmitter located at the bottom of said tower, a substantial length of circular waveguide transmission line for conducting UHF power from the transmitter to the antenna supported by the tower, the improvement comprising, (a) a polarization filter shunt including a shunt transmission line attached to said circular waveguide for conducting undesired waves therefrom to a load wherein said polarization filter shunt includes, (b) a square waveguide section that feeds two rectangular waveguide sections of which:

(c) one rectangular waveguide section longitudinal axis is parallel to the longitudinal axis of said square waveguide section, and (d) the other rectangular waveguide section longitudinal axis is at an angle to said longitudinal axis of said rectangular waveguide section, and (e) said two rectangular waveguide sections are oriented with their major transverse axes perpendicular where their said longitudinal axes cross, (f) a square waveguide-to-circular waveguide transition section, (g) said square waveguide section connects end-to-end with longitudinal axes coincident to said waveguide transition section, and (h) the circular end of said waveguide transition section connects to said circular waveguide output with said longitudinal axes thereof coincident, (i) whereby said desired polarization mode waves are output from said one rectangular waveguide section and said undesired polarization mode waves are output from said other rectangular waveguide section.

* * * * *